(12) United States Patent
Yamagishi

(10) Patent No.: US 9,803,688 B2
(45) Date of Patent: Oct. 31, 2017

(54) ROLLING BEARING GUIDE APPARATUS

(71) Applicant: NSK Ltd., Shinagawa-ku, Tokyo (JP)

(72) Inventor: Nobuaki Yamagishi, Hanyu (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 15/030,033

(22) PCT Filed: Oct. 31, 2014

(86) PCT No.: PCT/JP2014/079067
§ 371 (c)(1),
(2) Date: Apr. 15, 2016

(87) PCT Pub. No.: WO2015/068653
PCT Pub. Date: May 14, 2015

(65) Prior Publication Data
US 2016/0245337 A1 Aug. 25, 2016

(30) Foreign Application Priority Data
Nov. 6, 2013 (JP) .................................. 2013-230384

(51) Int. Cl.
F16C 29/06 (2006.01)
F16C 33/66 (2006.01)

(52) U.S. Cl.
CPC ...... *F16C 29/0609* (2013.01); *F16C 29/0611* (2013.01); *F16C 29/0635* (2013.01); *F16C 29/0669* (2013.01); *F16C 33/6648* (2013.01)

(58) Field of Classification Search
CPC ...... F16C 19/0609; F16C 33/10; F16C 33/66; F16C 33/6648; F16C 29/0611; F16C 29/0635; F16C 29/0669
(Continued)

(56) References Cited

U.S. PATENT DOCUMENTS 6,024,490 A * 2/2000 Shirai ................ F16C 29/0609
384/13
6,082,899 A * 7/2000 Suzuki ............... F16C 29/0609
184/5

(Continued)

FOREIGN PATENT DOCUMENTS

DE 19828587 A1 1/1999
DE 10 2006 056805 B3 7/2008

(Continued)

OTHER PUBLICATIONS

English Translation of International Preliminary Report on Patentability from International Patent Application No. PCT/JP2014/079067, mailed May 19, 2016.

(Continued)

*Primary Examiner* — Marcus Charles
(74) *Attorney, Agent, or Firm* — Shapiro, Gabor and Rosenberger, PLLC

(57) ABSTRACT

A rolling bearing guide apparatus 1 has a guide rail 2, a slider main body 8, a rolling elements 16, and an end cap 9a, 9b that defines a turn passage 15a, 15b, 15c, 15d that turns the direction of movement of the rolling element 16. The apparatus is provided with a lubrication member 14 impregnated with lubricant, arranged between the slider main body 8 and the end cap 9a, 9b, and partly exposed inside the turn passage 15a, 15b, 15c, 15d, enabling lubrication of the rolling element 16 for a long period of time and reducing efforts of maintenance.

9 Claims, 7 Drawing Sheets

(58) Field of Classification Search
USPC .......... 384/13, 15, 43–45, 49, 51; 184/5, 14, 184/100
See application file for complete search history.

(56) References Cited

U.S. PATENT DOCUMENTS

| | | | |
|---|---|---|---|
| 6,203,199 B1 | 3/2001 | Pfeuffer | |
| 6,461,045 B1* | 10/2002 | Kamimura | F16C 29/064 384/13 |
| 7,614,790 B2* | 11/2009 | Liu | F16C 29/0609 184/13.1 |
| 7,717,621 B2* | 5/2010 | Kakei | F16C 29/0635 384/13 |
| 2002/0027044 A1* | 3/2002 | Michioka | B23Q 11/0875 184/5 |
| 2005/0178619 A1* | 8/2005 | Chi-Meng | F16C 33/664 184/5 |
| 2006/0215943 A1* | 9/2006 | Agari | F16C 29/0611 384/13 |
| 2007/0140602 A1* | 6/2007 | Hsu | F16C 29/0664 384/45 |
| 2008/0178698 A1* | 7/2008 | Tanaka | F16D 1/0876 74/467 |
| 2012/0195535 A1 | 8/2012 | Shibuya et al. | |
| 2013/0108193 A1* | 5/2013 | Kuwabara | F16C 29/0611 384/13 |
| 2013/0108194 A1 | 5/2013 | Kikuchi | |

FOREIGN PATENT DOCUMENTS

| | | | | |
|---|---|---|---|---|
| JP | 09-303392 A | | 11/1997 | |
| JP | 10-019040 A | | 1/1998 | |
| JP | 10078032 A | * | 3/1998 | ............. F16C 29/06 |
| JP | 2000161356 A | * | 6/2000 | ............. F16C 29/086 |
| JP | 2002-147453 A | | 5/2002 | |
| JP | 2006-234039 A | | 9/2006 | |
| JP | 2006-266357 A | | 10/2006 | |
| JP | 2008-291904 A | | 12/2008 | |
| JP | 2008-291938 A | | 12/2008 | |
| JP | 2010-185582 A | | 8/2010 | |
| WO | WO-2010049283 A1 | * | 5/2010 | ............. A47B 88/10 |

OTHER PUBLICATIONS

International Search Report from International Patent Application No. PCT/JP2014/079067, Feb. 3, 2015.
Office Action, dated May 16, 2017, in Japanese Application No. 2013-230384.
Extended European Search Report, dated Jun. 21, 2017, in European Apllication No. 14860239.4.

* cited by examiner

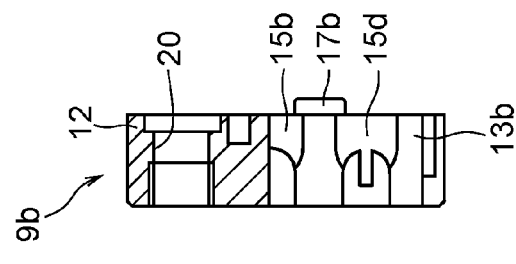
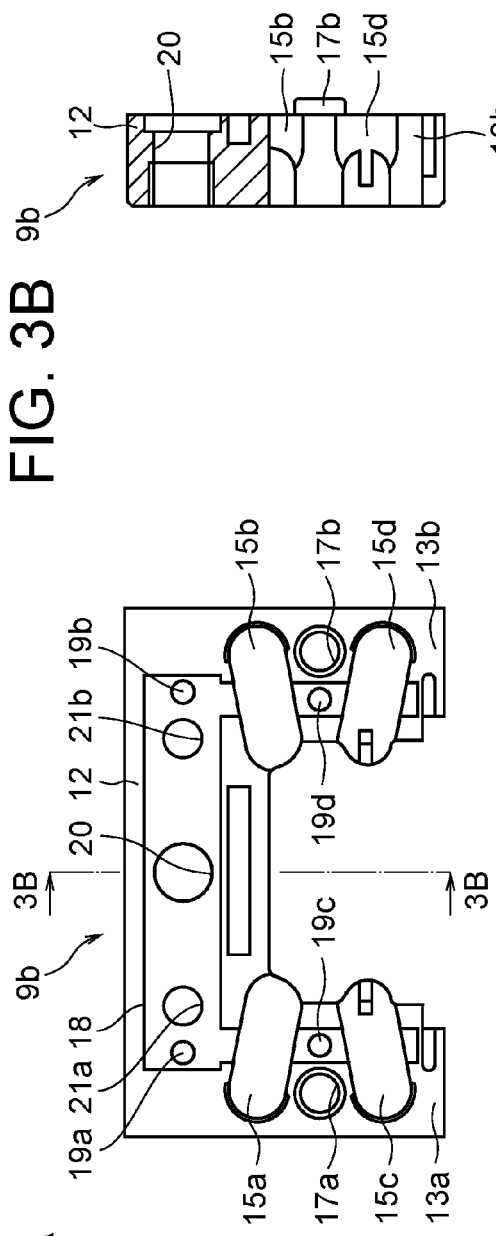
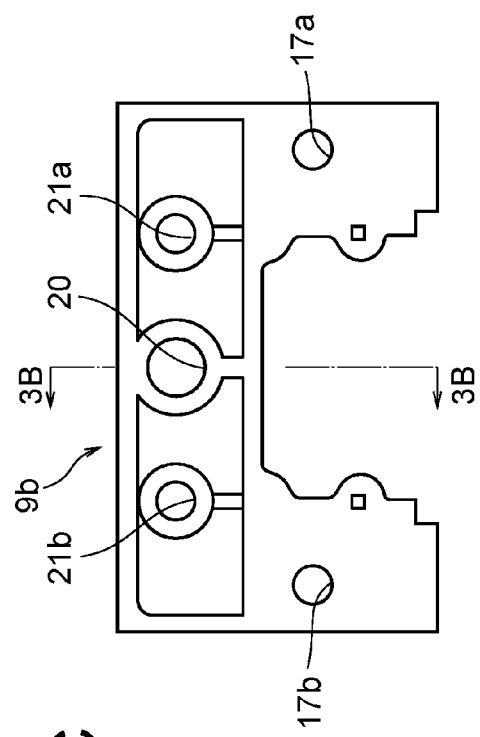

ROLLING BEARING GUIDE APPARATUS

CROSS-REFERENCE TO RELATED APPLICATIONS

The present application is a U.S. National Stage Entry of International Application No. PCT/JP2014/079067, filed Oct. 31, 2014, which claims priority to Japanese Application No. 2013-230384, filed Nov. 6, 2013.

TECHNICAL FIELD

The present invention relates to a rolling bearing guide apparatus having a guide rail, a slider, and rolling elements for use in a wide variety of robots, transfer apparatuses, or semiconductor manufacturing apparatuses and the like.

BACKGROUND ART

Known rolling bearing guide apparatuses include linear motion guide apparatuses having a linearly extending guide rail and curvilinear motion guide apparatuses having a curved guide rail.

The linear motion guide apparatus has, for example, a linear guide rail and a slider straddling on the guide rail and movable relative to the guide rail along its length direction. The slider includes a slider main body and end caps provided at its leading and trailing ends with respect to the direction of sliding of the slider. A lot of rolling elements roll in a rolling passage formed between the guide rail and the slider main body and circulate in a circulation passage provided in the slider to enable smooth relative movement of the guide rail and the slider. The linear guide apparatus can be mounted in any orientation.

The curvilinear guide apparatus has a curved guide rail (e.g. an annular guide rail), a slider capable of sliding on the curved guide rail, and rolling elements.

As disclosed in Patent Literature 1, in some rolling bearing guide apparatuses as such, a through hole is provided in a return guide that constitutes an inner surface of a turn passage in the end cap on the side of the slider main body. The through hole passes through the return guide from the slider main body side to the turn passage side, and lubricant is supplied into the turn passage from a lubricant supply passage provided on the side of the return guide facing the slider main body through the through hole.

As disclosed in Patent Literature 2, in some rolling bearing guide apparatuses, a member having a groove for oil supply is provided on the side of the end cap facing the slider main body, and lubricant is supplied into a turn passage through the groove for oil supply.

CITATION LIST

Patent Literature

Patent Literature 1: Japanese Patent Application Laid-Open No. 2008-291938
Patent Literature 2: Japanese Patent Application Laid-Open No. 2010-185582

SUMMARY OF INVENTION

Technical Problem

The inventions disclosed in Patent Literatures 1 and 2 teach an oil passage that is merely open to the turn passage, out of which a large quantity of lubricant or oil tends to flow at an early stage of supply of lubricant from outside, making it difficult to lubricate rolling elements over a long period of time.

In view of the above problem, an object of the present invention is to provide a rolling bearing guide apparatus that enable lubrication of rolling elements over a long period of time and can be maintained with reduced effort.

Solution to Problem

To solve the above problem, the present invention provides a rolling bearing guide apparatus comprising:
a guide rail;
a slider main body sliding on said guide rail;
rolling elements that roll between said slider main body and said guide rail as said slider main body slides; and
an end cap attached to an end surface of said slider main body that is located at a front or rear end thereof when said slider main body is sliding, and defining a turn passage that turns the direction of movement of said rolling elements;
the rolling bearing guide apparatus being characterized by comprising a lubrication member impregnated with lubricant, arranged between said slider main body and said end cap, and partly exposed inside said turn passage.

It is preferred that said lubrication member comprise two leg portions arranged on two sides of said guide rail respectively and a body portion integral with said two leg portions.

It is preferred that said lubrication member comprise two leg portions arranged on two opposite sides of said guide rail respectively and a body portion formed as a part separate from said two leg portions and arranged in contact with said two leg portions.

It is preferred that the density of the body portion be lower than the density of the leg portions.

It is preferred that a lubricant container in which lubricant to be supplied to the lubrication member be stored is attached to the slider main body or the end cap.

It is preferred that the lubricant stored in the lubricant container be supplied to the lubrication member utilizing capillary action.

It is preferred that the slider main body be provided with a lubricant storing bore in which lubricant is stored, and lubricant be supplied to the lubrication member from the lubricant storing bore.

Advantageous Effect of Invention

The present invention can provide a rolling bearing guide apparatus that enable lubrication of rolling elements over a long period of time and can be maintained with reduced effort.

BRIEF DESCRIPTION OF DRAWINGS

FIG. 2A shows the side facing the slider main body, and FIG. 2B shows a cross section along line 2B-2B in FIG. 2A.

FIGS. 3A, 3B, and 3C are diagrams showing the end cap of the rolling bearing guide apparatus according to the first embodiment of the present invention, where FIG. 3A shows the side facing the slider main body, FIG. 3B shows a cross section along line 3B-3B in FIGS. 3A and 3C, and FIG. 3C shows the side facing away from the slider main body.

FIG. 4A shows the side facing the end cap, FIG. 4B shows a cross section along line 4B-4B in FIG. 4A, and FIG. 4C shows the bottom.

FIG. 5A shows the side facing the side seal, and FIG. 5B shows a lubricant impregnation member housed in the lubricant container.

FIG. 6A shows the side facing the slider main body, and FIG. 6B is an enlarged cross sectional view taken along line 6B-6B in FIG. 6A.

FIG. 7A shows the side of the slider main body on which the end cap is attached, and FIG. 7B shows a cross section along line 7B-7B in FIG. 7A.

DESCRIPTION OF EMBODIMENTS

First Embodiment

Figure 1:
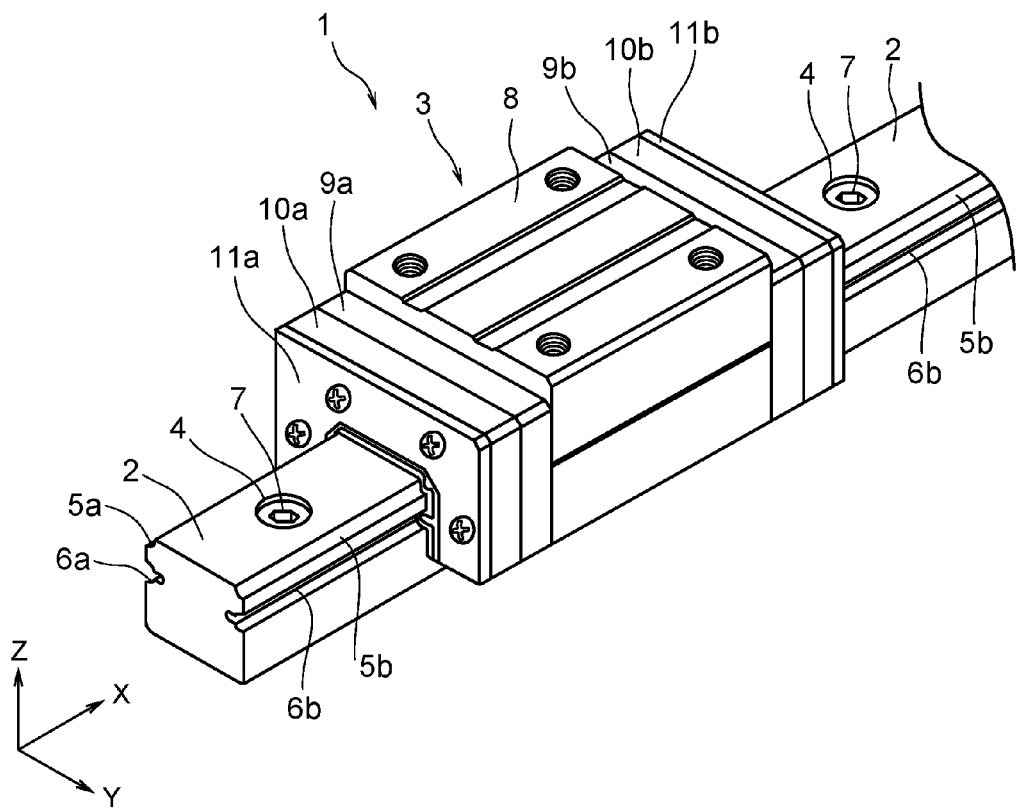
FIG. 1 is a perspective view of the rolling bearing guide apparatus according to a first embodiment of the present invention.

A rolling bearing guide apparatus according to a first embodiment of the present invention will be described with reference to FIGS. 1 to 5B. FIG. 1 is a perspective view of the rolling bearing guide apparatus according to the first embodiment of the present invention. In this specification, the direction in which the guide rail 2 extends will be referred to as the X axis direction, the direction perpendicular to the X axis direction and parallel to the surface of the guide rail 2 that is in contact with a part on which the guide rail is mounted will be referred to as the Y direction, and the direction perpendicular to both the X axis direction and the Y axis direction will be referred to as the Z axis direction, as shown in FIG. 1.

As shown in FIG. 1, the rolling bearing guide apparatus 1 is made up of a guide rail 2 having a long square rod shape and a slider 3 straddling on the guide rail 2 and movable relative to the guide rail 2 along its length direction.

The guide rail 2 is made of a metal and has a number of bolt holes 4 passing through it along the Z axis direction. The length of the guide rail 2 may be selected as desired to meet requirements. The guide rail 2 has edge rolling grooves 5a, 5b having a substantially circular arc cross sectional shape and side rolling grooves 6a, 6b, both of which extend along the X axis direction. The side rolling grooves 6a, 6b each have a relief groove on its bottom. The guide rail 2 can be mounted on a desired target object by bolts 7 inserted through the bolt holes 4. The target object is not shown in the drawings.

The slider 3 is made up of a slider main body 8 made of a metal, end caps 9a, 9b attached to the front and rear end of a slider main body 8 with respect to its sliding direction, lubricant containers 10a, 10b that are attached to the slider main body 8 with the end caps 8a, 8b between, and side seals 11a, 11b that are attached to the slider main body 8 with the end caps 9a, 9b and the lubricant containers 10a, 10b between.

The side seals 11a, 11b each have a lip part made of an elastic material and in sliding contact with the guide rail. The lip part prevents foreign matters from entering between the slider 3 and the guide rail 2.

Figure 2A:
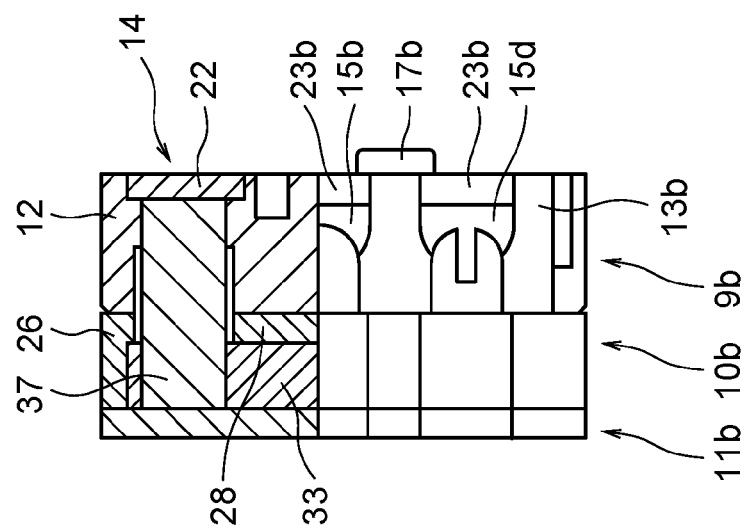
FIGS. 2A and 2B are diagrams showing an end cap, a lubrication member, a lubricant container, and a side seal of the rolling bearing guide apparatus according to the first embodiment of the present invention, where
Figure 2B:
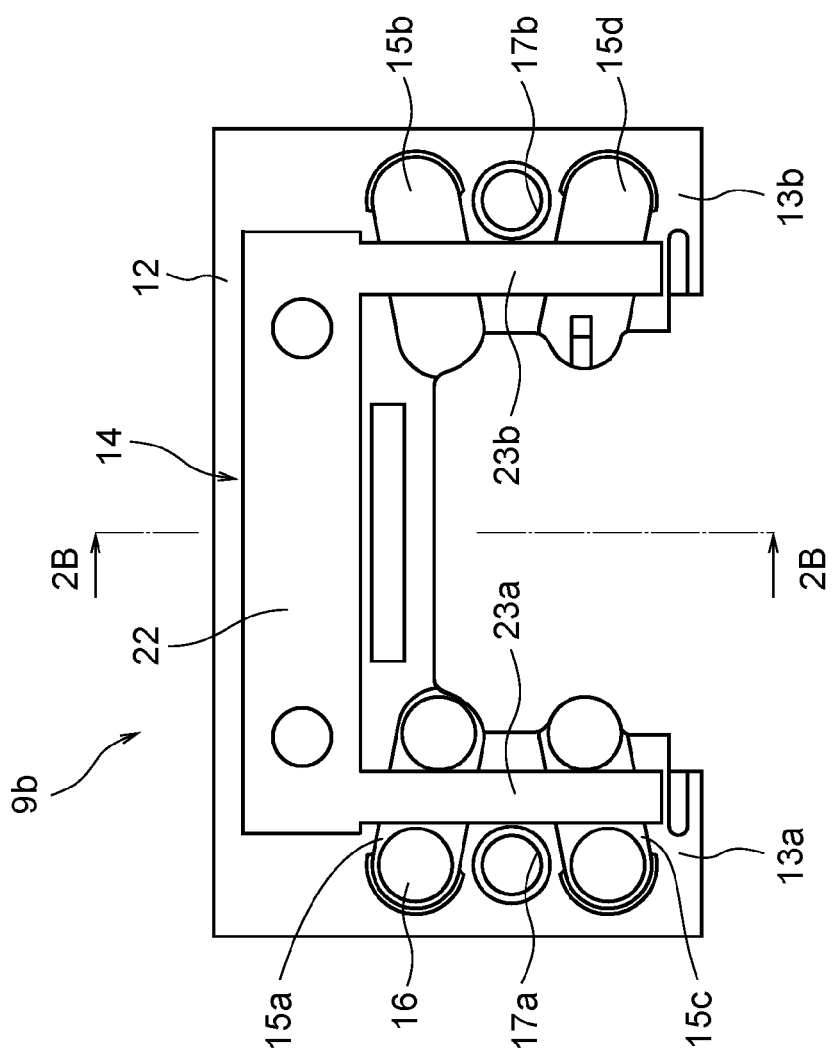

FIGS. 2A and 2B are diagrams showing the end cap 9b, a lubrication member 14, the lubricant container 10b, and the side seal 11b of the rolling bearing guide apparatus according to the first embodiment of the present invention, where FIG. 2A shows the side facing the slider main body, and FIG. 2B shows a cross section along line 2B-2B in FIG. 2A. The structure around the other end cap 9a is the same as the structure around the end cap 9b described in the following and will not be described.

As shown in FIG. 2A, the end cap 9b has a body portion 12 having a substantially quadrangular prism shape extending along the Y axis direction and leg portions 13a, 13b projecting from the respective ends of the body portion 12 in one direction parallel to the Z axis. The lubrication member 14, which is made of a sintered material, is arranged on the side of the end cap 9b facing the slider main body. The lubrication member 14 is an integral part having a body portion 22 and leg portions 23a, 23b. The sintered material of the lubrication member 14 may be porous. The sintered material may be replaced by other porous materials. The material of the lubrication member 14 may be a porous polymer such as plastic, elastomer, or rubber. With the lubrication member 14, lubricant equal in quantity to lubricant supplied to the rolling elements 16 is guided to the contact portion of the lubrication member with the rolling elements 16. The body portion 22 and the leg portions 23a, 23b of the lubrication member 14 may be separate parts that are arranged to be in contact with each other.

Turn passages 15a, 15b are provided at the boundary of the body portion 12 and the leg portion 13a of the end cap 9b and the boundary of the body portion 12 and the leg portion 13b of the end cap 9b. Turn passages 15c, 15b are provided at the end portions of the leg portions 13a, 13b. The turn passages 15a to 15d are defined by an outer surface and an inner surface. The outer surface is provided on the end cap 9b as a groove and mainly constitutes a surface on the side seal 11b side. The inner surface is constituted by the leg portion 23a, 23b of the lubrication member 14 and mainly constitutes a surface on the slider main body 8 side.

The turn passages 15a to 15d are curved in arc shapes to turn the direction of movement of the rolling elements 16 rolling between the slider main body 8 and the edge rolling grooves 5a, 5b and the side rolling grooves 6a, 6b by 180 degrees. Thus, the turn passages 15a to 15d cooperate with circulation passages (not shown) to cause the rolling elements 16 to circulate. FIG. 2A shows rolling elements 16 received in the turn passages 15a and 15c. Rolling elements 16 are also received in the turn passages 15b and 15d.

Between the turn passage 15a and the turn passage 15c and between the turn passage 15b and the turn passage 15d, the end cap is formed with through-hole portions 17a, 17b that allow the end cap 9b, the lubricant container 10b, and the side seal 11b to be fixedly attached to the slider main body 8 by screws. The through-hole portion 17a, 17b defines a through hole running along the X axis direction and extends as a cylindrical part toward the slider main body 8. The cylindrical part is fitted to a large-diameter portion at the open end (not shown) of a screw hole provided in the slider main body to facilitate positioning of the end cap.

As shown in FIG. 2B, the lubricant container 10b for storing lubricant is arranged on the side of the end cap 9b opposite to the slider main body 8. The side seal 11b is arranged on the side of the lubricant container 10b opposite to the end cap 9b.

A lubricant impregnation member 33 is housed in the lubricant container 10b. The lubricant impregnation member 33 is impregnated with lubricant. An introduction member 37 made of a sintered material is arranged in contact with the lubricant impregnation member 33. The lubricant impregnated in the lubricant impregnation member 33 is supplied to the body portion 22 of the lubrication member 14 through the introduction member by capillarity. The sintered material used in the introduction member 37 may be porous. It is preferred that the density of the introduction member 37 be lower than the density of the lubrication member 14. This enables smooth introduction of lubricant to the lubrication member 14 while preventing excessive supply of lubricant to the rolling elements. The lubricant supplied to the body portion 22 of the lubrication member 14 is applied to the rolling elements 16 that are in contact with the leg portions 23a, 23b of the lubrication member 14. Making use of capillary action enables direct supply of lubricant to the rolling elements 16 no matter in what orientation the rolling bearing guide apparatus 1 is mounted. Without capillary action, there is a possibility that the lubricant in the lubricant container and the end cap may be biased to one side temporarily with movement of the slider 3 to make it hard for the lubricant to flow from the lubricant container to the end cap. Making use of capillary action can prevent this from occurring. When it is necessary to replenish the lubricant container 10b with lubricant, the side seal 11b can be removed to allow the replenishment.

FIGS. 3A, 3B, and 3C are diagrams showing the end cap 9b of the rolling bearing guide apparatus 1 according to the first embodiment of the present invention, where FIG. 3A shows the side facing the slider main body 8, FIG. 3B shows a cross section along line 3B-3B in FIGS. 3A and 3C, and FIG. 3C shows the side facing away from the slider main body 8.

The body portion 12 of the end cap 9b has a through bore 20 for the introduction member at its center, which passes through it along the X axis direction and in which the introduction member 37 is housed.

On both sides of the through bore 20 for the introduction member, there are provided body portion screw holes 21a, 21b, which pass through the body portion 12 along the X axis direction to allow the end cap 9b, the lubricant container 10b, and the side seal 11b to be fixed to the slider main body 8 by screws.

On the side of the body portion 12 and the leg portions 13a, 13b of the end cap 9b that face the slider main body 8, there is provided a lubrication member receiving portion 18, which is a recess for receiving the lubrication member having a shape similar to the lubrication member 14.

The lubrication member receiving portion 18 has recessed portions 19a, 19b, 19c, 19d to which projections 24a, 24b, 24c, 24d provided on the lubrication member 14 are to be fitted. The projections 24a, 24b, 24c, 24d are shown in FIGS. 4A, 4B, and 4C.

Figure 4A:
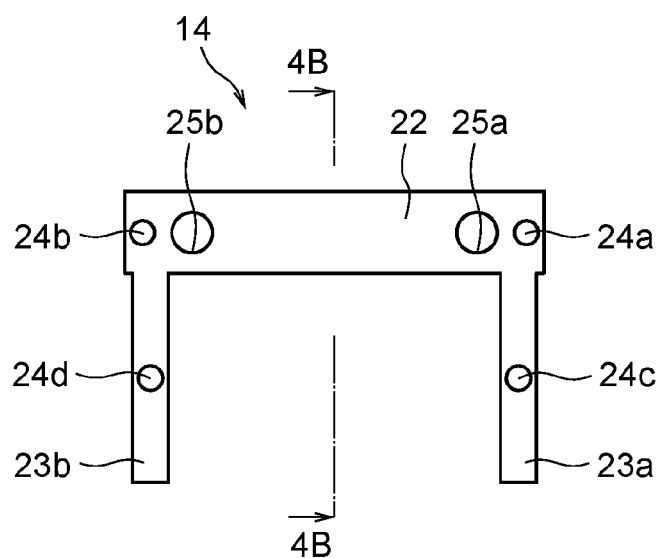
FIGS. 4A, 4B, 4C are diagrams showing the lubrication member of the rolling bearing guide apparatus according to the first embodiment of the present invention, where
Figure 4B:
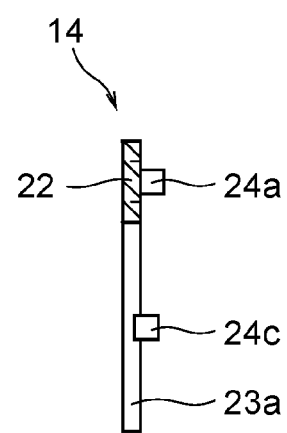
Figure 4C:
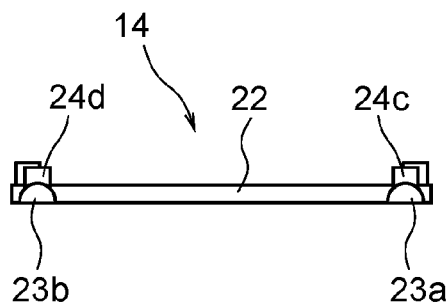

FIGS. 4A, 4B, 4C are diagrams showing the lubrication member 14 of the rolling bearing guide apparatus 1 according to the first embodiment of the present invention, where FIG. 4A shows the side facing the end cap 9b, FIG. 4B shows a cross section along line 4B-45 in FIG. 4A, and FIG. 4C shows the bottom.

The lubrication member 14 includes the body portion 22 and the leg portions 23a, 23b, as described above. The body portion 22 is a plate-like portion. As will be seen in FIG. 4C, each of the leg portions 23a, 23b has a half-cylindrical column shape or a shape of a circular column cut into half along its center line, with its curved surface facing the end cap. The leg portions 23a, 23b serve as return guides that turn the direction of movement of the rolling elements.

The body portion 22 of the lubrication member 14 has cylindrical projections 24a, 24b provided on its side facing the end cap 9b at locations near its both ends. The leg portions 23a, 23b of the lubrication member 14 each have a cylindrical projection 24c, 24d provided on the side facing the end cap 9b at substantially the center thereof. The projections 24a to 24d are fitted to the recessed portions 19a to 19d provided on the lubrication member receiving portion 18 of the end cap 9b. This facilitates positioning of the lubrication member 14.

The body portion 22 of the lubrication member 14 has screw holes 25a, 25b for the body portion, which pass through it along the X axis direction.

Figure 5A:
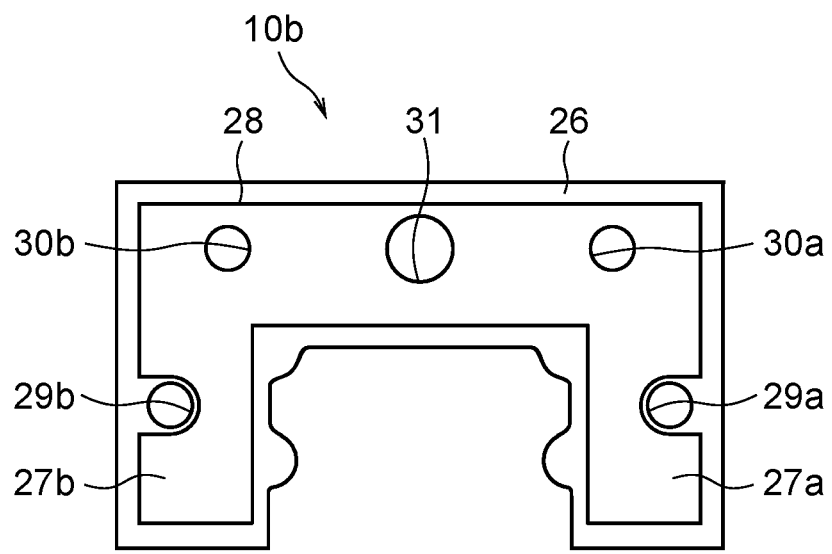
FIGS. 5A and 5B are diagrams showing the lubricant container of the rolling bearing guide apparatus according to the first embodiment of the present invention, where
Figure 5B:
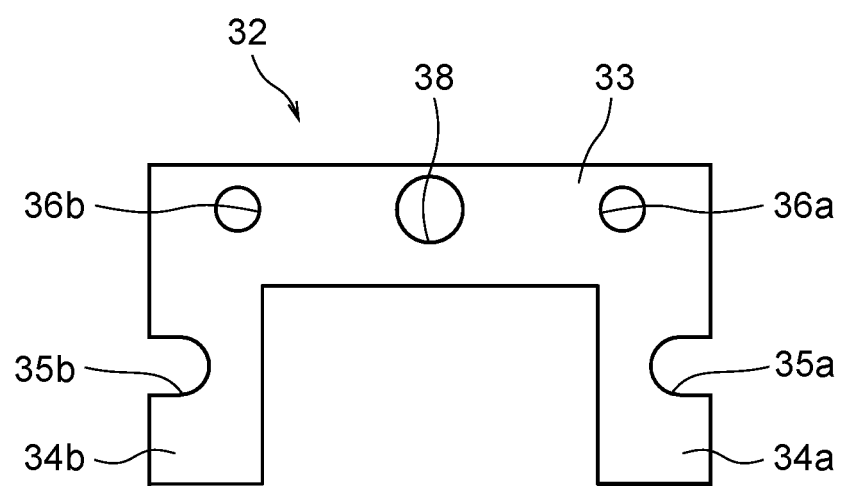

FIGS. 5A and 5B are diagrams showing the lubricant container 10b of the rolling bearing guide apparatus 1 according to the first embodiment of the present invention, where FIG. 5A shows the side facing the side seal 11b, and FIG. 5B shows the lubricant impregnation member 32 housed in the lubricant container 10b.

The lubricant container 10b has a body portion 26 extending along the Y axis direction and leg portions 27a, 27b extending in one direction along the Z axis direction from both ends of the body portion 26. The lubricant container 10b has a box structure that opens toward the side seal 11b. A housing space 28 for the lubricant impregnation member 32 is provided on its side facing the side seal 11b.

The leg portions 27a, 27b of the lubricant container 10b are each formed with a leg's cylindrical portion 29a, 29b, which has a substantially cylindrical shape. The leg's cylindrical portions 29a, 29b are used to fix the end cap 9b, the lubricant container 10b, and the side seal 11b to the slider main body 8, with screws passing through them.

The body portion 26 of the lubricant container 10b has a through hole 31 for the introduction member, which allows the aforementioned introduction member 37 to pass. The body portion 26 of the lubricant container 10b has screw holes for the body portion 30a, 30b provided on both sides of the through hole 31 for the introduction member and passing through it along the X axis direction.

As shown in FIG. 5B, the lubricant impregnation member 32 is made of felt and has a body portion 33 and the leg portions 34a, 34b so that it is housed in the housing space 28 provided in the lubricant container 10b. To avoid interference with the leg's cylindrical portions 29a, 29b of the lubricant container 10b, the leg portions 34a, 34b are provided with escape portions 35a, 35b at locations corresponding to the leg's cylindrical portions 29a, 29b. The felt used in the lubricant impregnation member 32 may be made of wool, aramid fiber, glass fiber, cellulose fiber, nylon fiber, polyester fiber, polyether fiber, polyolefin fiber, or rayon fiber.

The body portion 33 of the lubricant impregnation member 32 has a through hole 38 for the introduction member into which the introduction member 37 is to be inserted, provided at a location in alignment with the through hole 31 for the introduction member provided in the lubricant container 10b. The body portion 33 of the lubricant impregnation member 32 has screw holes 36a, 36b for the body portion which allow screws to pass through them, on both sides of the through hole 38 for the introduction member.

In the above-described apparatus according to the first embodiment of the present invention, an appropriate quantity of lubricant is supplied from the lubrication member 14 to the rolling elements 16. Moreover, since the apparatus is provided with the lubricant container in which lubricant is stored, an excellent lubrication can be maintained for a long period of time without replenishment of lubricant.

Since the leg portions 23a, 23b of the lubrication member 14 that are in contact with the rolling elements 16 provide inner surfaces of the turn passages 15a, 15b, on which the centrifugal force of the rolling elements 16 moving at high speed does not act, abrasion or breakage of the leg portions 23a, 23b by the contact with the rolling elements 16 can be prevented.

Second Embodiment

A rolling bearing guide apparatus according to a second embodiment of the present invention will be described with reference to FIGS. 6A and 6b. The rolling bearing guide apparatus according to the second embodiment differs from the above-described rolling bearing guide apparatus according to the first embodiment in the structure of the lubrication member and in that the rolling bearing apparatus according to the second embodiment does not have a lubricant container. In the other respects, the rolling bearing apparatus according to the second embodiment is the same as the rolling bearing apparatus according to the first embodiment. Therefore, redundant descriptions will not be made, and only the lubrication member and the means for supplying lubricant to the lubrication member will be described.

Figure 6A:
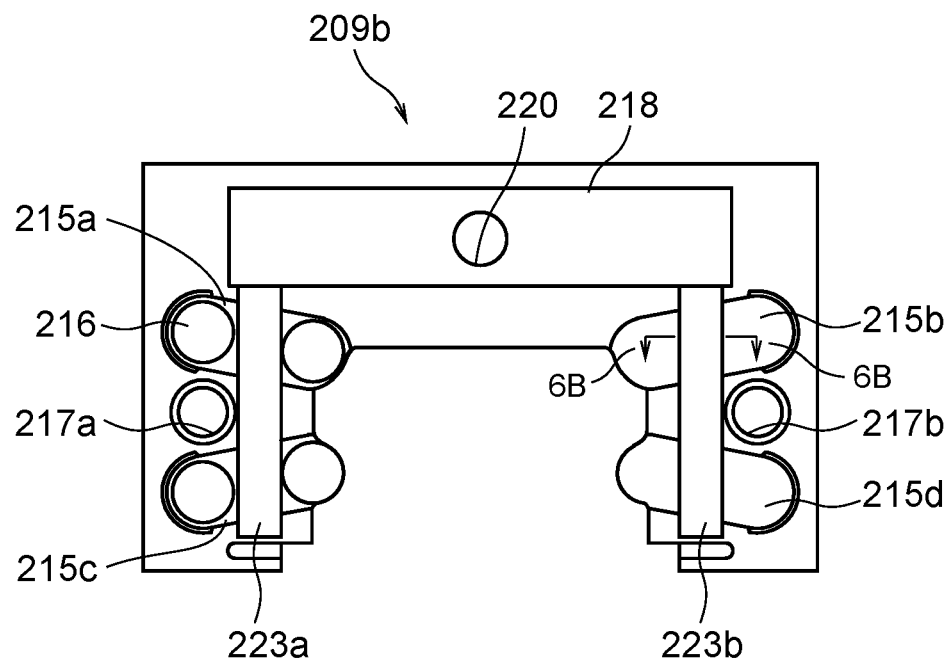
FIGS. 6A and 6B are diagrams showing an end cap and lubrication members of a rolling bearing guide apparatus according to a second embodiment of the present invention, where
Figure 6B:
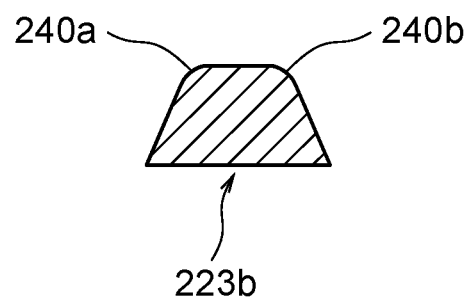

FIGS. 6A and 6B are diagrams showing an end cap 209b and lubrication members 223a, 223b of the rolling bearing guide apparatus according to the second embodiment of the present invention, where FIG. 6A shows the side facing the slider main body, and FIG. 6B is an enlarged cross sectional view taken along line 6B-6B in FIG. 6A.

In the second embodiment, the end cap 209b has the same shape as the end cap 9b in the above-described first embodiment. The lubrication members 223a, 223b include only portions equivalent to the leg portions 23a, 23b of the lubrication member 14 in the first embodiment and do not have a portion corresponding to the body portion 22.

As described above, the rolling bearing guide apparatus according to the second embodiment does not have a lubricant container. To supply lubricant to the lubrication members 223a, 223b, lubricant is injected through a grease nipple screwed into a female screw thread provided in a lubricant supply hole 220 and stored in a lubricant storing portion 218 provided on the surface of the end cap 209b facing the slider main body as a recess, so that lubricant is supplied from the lubricant storing portion 218. The aforementioned grease nipple is not shown in the drawings. The female screw thread in the lubricant supply hole 220 is adapted in such a way that the grease nipple can be screwed into it to the extent that the grease nipple does not come in contact with the slider main body. The lubricant storing portion 218 may be filled with a lubricant impregnation member different from the lubrication members 223a, 223b. In this case, it is preferred that the lubricant impregnation member have a density lower than the density of the lubrication members 223a, 223b. This enables the lubricant impregnation member to be impregnated with a larger quantity of lubricant.

As will be seen from the cross section 6B-6B shown in FIG. 6B, the lubrication members 223a, 223b have a substantially trapezoidal shape in their cross section along their width and are round-cornered at their edges 240a, 240b to be in contact with the rolling elements 216. The lubrication members 223a, 223b serve as a return guide. In the case of the leg portions 23a, 23b of the lubrication member 14 in the above-described first embodiment, point contact between the rolling elements and the lubrication members is achieved, enabling reduction of the quantity of lubricant supplied to the rolling elements. On the other hand, in the case of the lubrication members 223a, 223b in the second embodiment having the above-described shape, the rolling elements 216 roll on the upper surface of the trapezoidal lubrication members 223a, 223b. This makes the length of contact of the rolling elements and the lubrication members larger, enabling an increased quantity of lubricant to be supplied to the rolling elements 216, and provides the effect of removing foreign matters from the rolling passage.

In the apparatus according to the second embodiment, an appropriate quantity of lubricant can be supplied to the rolling elements without a lubricant container, and the frequency of replenishment of lubricant can be decreased.

Third Embodiment

The rolling bearing guide apparatus according to a third embodiment of the present invention will be described with reference to FIGS. 7A and 7B. The rolling bearing guide apparatus according to the third embodiment differs from the rolling bearing guide apparatus according to the first embodiment in that a space in which lubricant is stored is provided in the slider main body instead of the lubricant container and is the same as the apparatus according to the first embodiment in the other respects. Therefore, redundant description will not be made, and the following description will be mainly focused on the structure provided in the slider main body to store lubricant instead of the lubricant container.

Figure 7A:
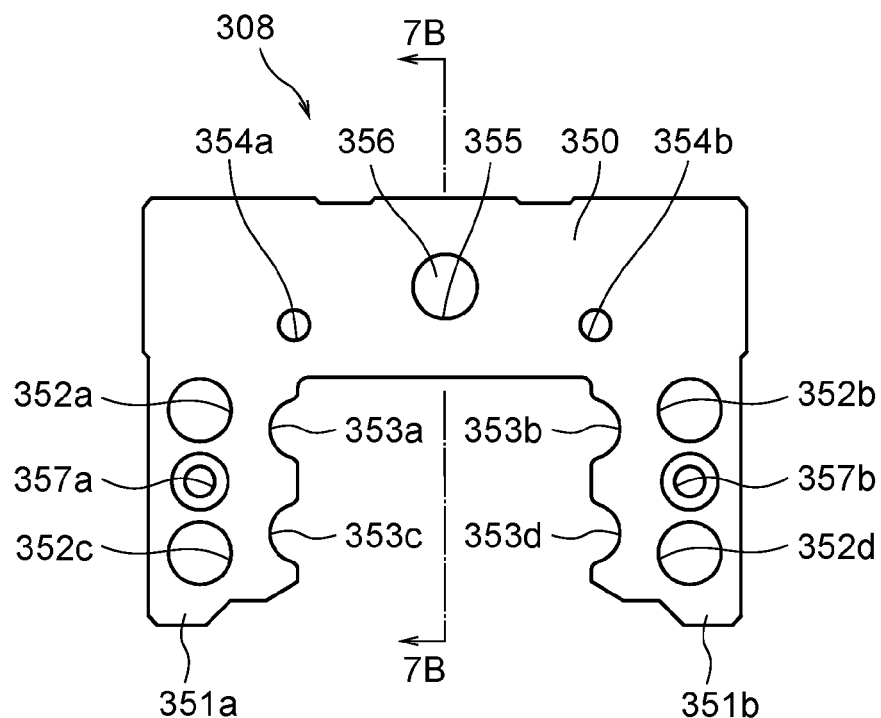
FIGS. 7A and 7B are diagrams showing a slider main body, an end cap, and a lubrication member in a rolling bearing guide apparatus according to a third embodiment of the present invention, where
Figure 7B:
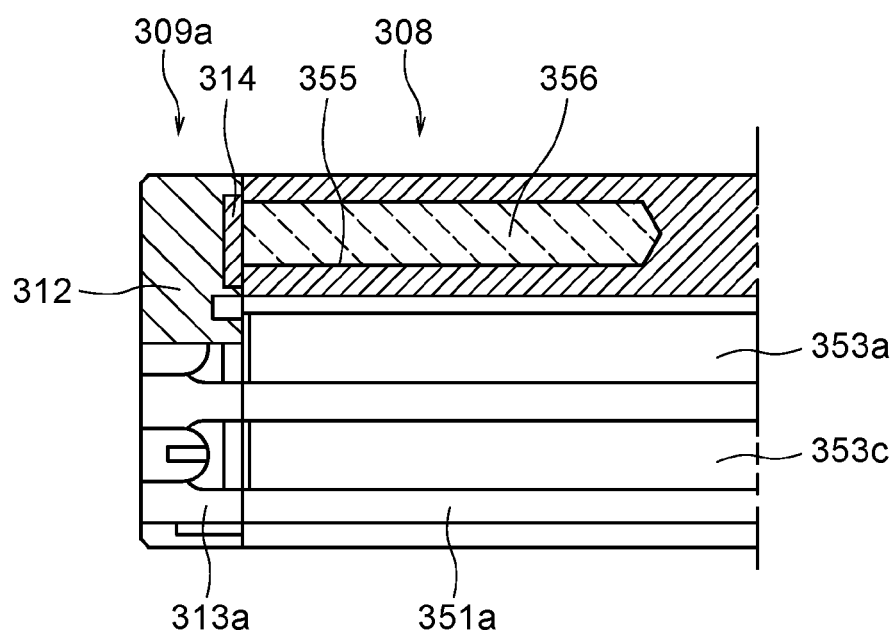

FIGS. 7A and 7B are diagrams showing a slider main body 308, an end cap 312, and a lubrication member 314 in the rolling bearing guide apparatus according to the third embodiment of the present invention, where FIG. 7A shows the side of the slider main body on which the end cap is attached, and FIG. 7B shows a cross section along line 7B-7B in FIG. 7A.

The slider main body 308 includes a body portion 350 having a plate-like shape extending in the X and Y axis directions and leg portions 351a, 351b extending in one direction along the Z axis direction from both ends of the body portion 350 extending in the X axis direction over its entire length along the X axis direction.

The leg portions 351a, 351b are provided with circulation passages 352a, 352b, 352c, 352d that pass through them along the X axis direction to allow the rolling elements to circulate. Between the circulation passages 352a and 352c and between the circulation passages 352b and 352d, there are provided leg's screw holes 357a, 357b having a female screw thread inside to allow screws for fixing the end cap and the side seal to the slider main body 308 to be screwed in them. The opposed surfaces of the leg portions 351a and 351b are provided with rolling grooves 353a, 353b, 353c, 353d extending along the X axis direction, which allow the rolling elements to roll between the guide rail and them.

The body portion 350 of the slider main body 308 is provided with body's screw holes 354a, 354b having a female screw thread inside to allow screws for fixing the end cap and the side seal to the slider main body 308 to be screwed in them.

Moreover, the body portion 350 is provided with a lubricant storing bore 355, which extends from the center of the end surface of the body portion 350 that faces the end cap in the X axis direction. The lubricant storing bore 355 is filled with a lubricant impregnation member 356.

As shown in FIG. 7B, the lubricant impregnation member 356 is in contact with the lubrication member 314, so that lubricant stored in the lubricant impregnation member 356 is supplied to the lubrication member 314. Thus, lubricant is applied to the rolling elements passing through the turn passage by the lubrication member 314.

The apparatus according to the third embodiment does not have a lubricant container. This makes the number of components smaller than that in the apparatus according to the first embodiment, saving efforts of assembly and enabling reduction in the size of the slider along its moving direction. Moreover, since an appropriate quantity of lubricant can be supplied to the rolling elements, excellent lubrication state can be maintained for a long period of time without replenishment of lubricant.

While specific embodiments of the present invention have been described in the foregoing, the present invention is not limited to them, but various modifications and improvements can be made to them.

For instance, as to the cross sectional shape of the portion of the lubrication member to be in contact with the rolling elements, the cross sectional shape of the leg portions 23a, 23b of the lubrication member 14 in the first embodiment may be adopted in the lubrication members 223a, 223b in the second embodiment. Conversely, the cross sectional shape of the lubrication members 223a, 223b in the second embodiment may be adopted in the leg portions 23a, 23b of the lubrication member 14 in the first embodiment.

The lubricant container in the first embodiment is not necessarily required to be provided on both the front and rear side of the slider, but it may be provided only one of the front and rear sides. Alternatively, the lubricant container may be provided at a location other than the front and rear of the slider. The lubricant container may be adopted in combination with the lubricant storing bore according to the third embodiment.

The lubricant storing bore according to the third embodiment may be provided for either both or one of the lubrication members provided on the front and rear sides of the slider. Alternatively, the lubricant storing bore may be configured to pass through the slider along the X axis direction to supply lubricant to both of the sliders provided on the front and rear sides of the slider.

The arrangement for supplying lubricant according to the present invention can be applied not only to apparatuses in which two rolling grooves are provided on each of the two opposite sides of the guide rail as in the above-described embodiment but also to apparatuses in which one or three or more rolling grooves are provided on each of the two opposite sides of the guide rail.

The shape of the lubrication member is not limited to those in the above-described embodiments, but it may have any shape on condition that it is exposed to the turn passage and able to apply lubricant to rolling elements without hindering rolling of the rolling elements.

As described above, the present invention can provide a rolling bearing guide apparatus that allows lubrication of rolling elements over a long period of time and can be maintained with reduced effort.

REFERENCE SINGS LIST

1: rolling bearing guide apparatus
2: guide rail
3: slider
4: bolt hole
5a, 5b: edge rolling groove
6a, 6b: side rolling groove
7: bolt
8, 308: slider main body
9a, 9b, 209b, 309a: end cap
10a, 10b: container
11a, 11b: side seal
12, 312: body portion
13a, 13b, 313a: leg portion
14, 314: lubrication member
15a, 15b, 15c, 15d, 215a, 215b, 215c, 215d: turn passage
16, 216: rolling element
17a, 17b, 217a, 217b: through-hole portion
18: lubrication member receiving portion
19a, 19b, 19c, 19d: recessed portion
20: through bore
21a, 21b: body portion screw hole
22: body portion
23a, 23b: leg portion
24a, 24b, 24c, 24d: projection
25a, 25b: body's screw hole
26: body portion
27a, 27b: leg portion
28: housing space
29a, 29b: leg's cylindrical portion
30a, 30b: body's screw hole
31: through hole for introduction member
32: lubricant impregnation member
33: body portion
34a, 34b: leg portion
35a, 35b: escape portion
36a, 36b: body's screw hole
37: introduction member
220: lubricant supply hole
223a, 223b: lubrication member
240a, 240b: edge
350: body portion
351a, 351b: leg portion
352a, 352b, 352c, 352d: circulation passage
353a, 353b, 353c, 353d: rolling groove
354a, 354b: body's screw hole
355: lubricant storing bore
356: lubricant impregnation member
357a, 357b: leg's screw hole

What is claimed is:

1. A rolling bearing guide apparatus comprising:
a guide rail;
a slider main body sliding on said guide rail;
rolling elements that roll between said slider main body and said guide rail as said slider main body slides; and
an end cap attached to an end surface of said slider main body that is located at a front or rear end thereof when said slider main body is sliding, and defining a turn passage that turns a direction of movement of said rolling elements;
the rolling bearing guide apparatus being characterized by comprising a lubrication member impregnated with lubricant, arranged between said slider main body and said end cap, and partly exposed inside said turn passage to serve as a return guide that turns the direction of movement of the rolling elements.

2. A rolling bearing guide apparatus according to claim 1, characterized in that said lubrication member comprises two leg portions arranged on two sides of said guide rail respectively and a body portion integral with said two leg portions.

3. A rolling bearing guide apparatus according to claim 2, characterized in that the density of said body portion is lower than the density of said leg portions.

4. A rolling bearing guide apparatus according to claim 1, characterized in that said lubrication member comprises two leg portions arranged on two opposite sides of said guide rail respectively and a body portion formed as a part separate from said two leg portions and arranged in contact with said two leg portions.

5. A rolling bearing guide apparatus according to claim 4, characterized in that the density of said body portion is lower than the density of said leg portions.

6. A rolling bearing guide apparatus according to claim 1, characterized in that a lubricant container in which lubricant to be supplied to said lubrication member is stored is attached to said slider main body or said end cap.

7. A rolling bearing guide apparatus according to claim 6, characterized in that said lubricant stored in said lubricant container is supplied to said lubrication member utilizing capillary action.

8. A rolling bearing guide apparatus according to claim 1, characterized in that said slider main body is provided with a lubricant storing bore in which lubricant is stored, and lubricant is supplied to said lubrication member from said lubricant storing bore.

9. A rolling bearing guide apparatus according to claim 1,
   wherein an outer surface of the return guide is defined by the turn passage in the end cap, and
   an inner surface of the return guide that faces the outer surface is at least partly defined by a portion of the lubrication member that is partly exposed inside said turn passage.

* * * * *